Jan. 24, 1956 E. W. QUACKENBUSH 2,732,064
SEED PACKAGE
Filed Jan. 10, 1952
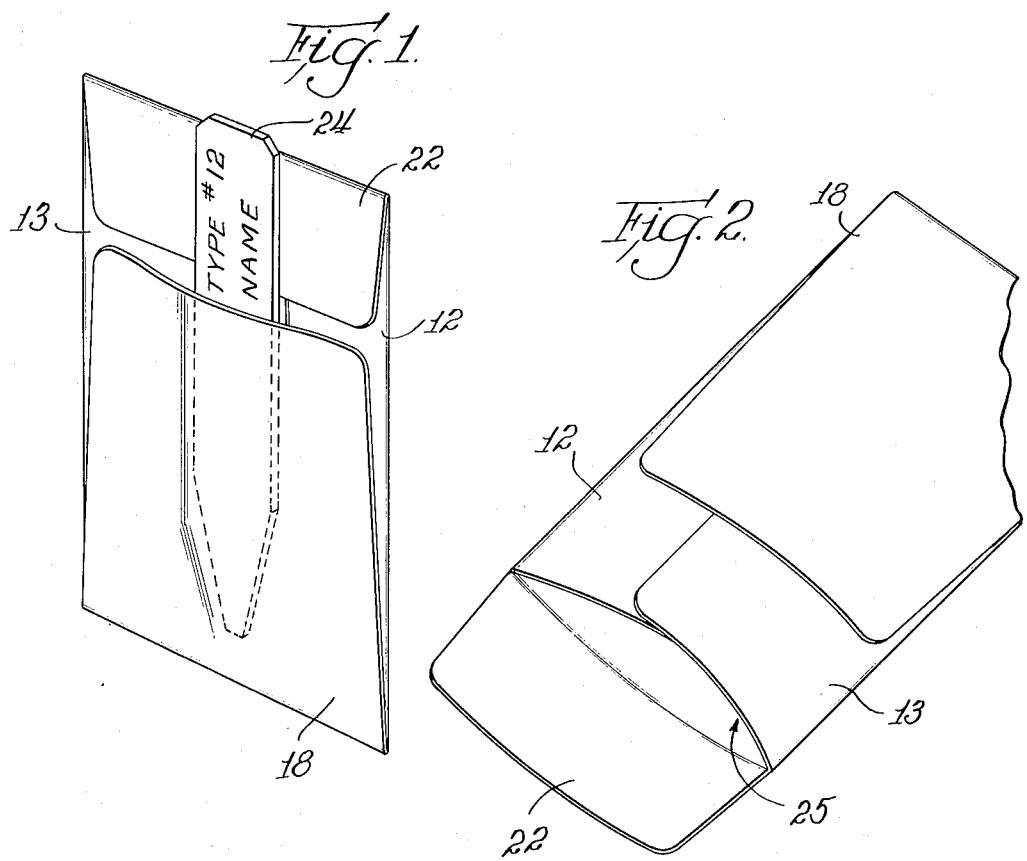
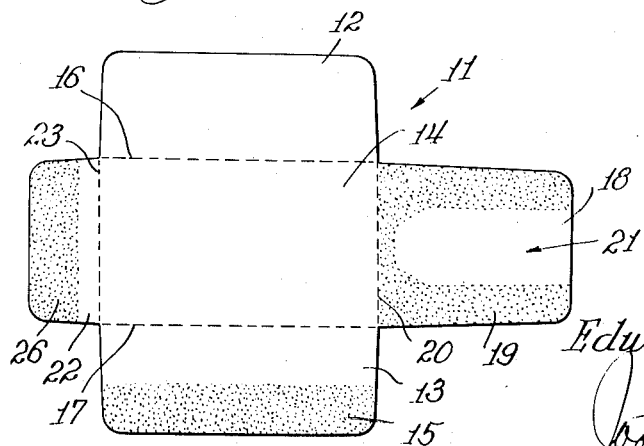
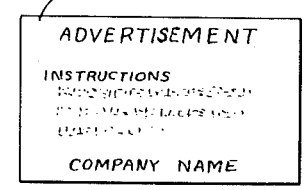
INVENTOR.
Edward W. Quackenbush
BY
Attys

United States Patent Office 2,732,064
Patented Jan. 24, 1956

2,732,064

SEED PACKAGE

Edward W. Quackenbush, Chicago, Ill.

Application January 10, 1952, Serial No. 265,845

3 Claims. (Cl. 206—47)

This invention relates to a receptacle having a detachably held closure, and more particularly to a seed package having a closure therefor held in place by a seed marker stick.

It is desirable among seed merchants to package seeds either for sale or for free distribution as samples so that the seeds are readily obtainable for visual inspection and manual apprehension without the necessity of destroying the package or container. Prior packaging devices necessarily utilize adhesive or mechanical closures to safeguard the contents against loss or contamination and such necessitates the destruction of the packages in order to gain access to the contents of the package for use or inspection.

Furthermore, it is desirable to provide a seed container which is quickly and easily closed and secured in a closed position to prevent the loss of seeds during handling and shipping of the seed packages. Existing packaging practices also require preliminary printing of seed identifying information on the packages or the provision of blank spaces on the packages upon which the supplier must enter such seed identifying information. The former practice is unduly expensive and requires the supplier to stock a large number of different seed containers while the latter is both inconvenient and time consuming. Also, florists and other parties who receive the seeds and subsequently plant them to determine the germination characteristics of the seeds often confuse seeds from different suppliers after they are planted.

Accordingly, one object of the invention is to provide a seed package or container which is capable of being opened to permit visual inspection of the seeds and manual apprehension thereof without destruction of the container or package.

Another object is to provide a seed package which is opened without physical destruction thereof but which is also capable of being positively secured against inadvertent or accidental opening.

A further object of the invention is to provide an improved seed package which is stiffened against bending or folding by a rigid member which also gives the container reinforcement when filled.

A further object is to provide a seed package in which a seed marker stick is both utilized as identifying means for the seeds contained in the package and as an element in the closure for the package.

A further object concerns the provision of a seed package wherein a seed marker stick is used as an element of the package closure so that each package of seed contains a marker stick for use in identifying seeds which are planted by the recipient of the seed packages.

In accordance with these and other objects, the invention comprises an envelope open at one end to receive a portion of seeds to be packaged and includes a flap contiguous to the open end for closing the seed containing envelope. Another flap integral with the envelope and positioned opposite to the closure flap is superimposed upon the body of the envelope and secured thereto along two spaced parallel lines to produce a pocket and to provide double reinforcement over the major portion of the back side, particularly at the end to which the seeds gravitate. A seed marker stick having indicia thereon identifying the seed contained in the package is inserted into the pocket with one end of the stick extending outwardly therefrom to engage the folded envelope closing flap to secure this flap in a closed position.

Many other objects and advantages of this invention will become apparent from a consideration of the following specification and claims when taken in conjunction with the drawings wherein:

Fig. 1 is a perspective view of a seed package utilizing a seed marker stick to secure the closure of the package;

Fig. 2 is a perspective view of the seed package in an unsealed position;

Fig. 3 is a reduced plan view of the sheet of material forming the seed package in Figs. 1 and 2; and Fig. 4 is a reduced plan view of the front surface of the seed package shown in Figs. 1 and 2.

Referring now to the drawings wherein like reference numerals indicate the same elements throughout the several views and, in particular to Fig. 3, a sheet of paper or other web material indicated generally as 11 is formed with two longitudinally extending flaps 12 and 13 projecting outwardly from a body portion 14 of the sheet 11. The flap 13 is coated with an adhesive material 15 along one edge thereof, which adhesive material 15 may be either of a wet or dry type.

The flap 12 is folded inwardly toward the body portion 14 of the sheet 11 about an imaginary axis indicated as 16 extending along an inner edge of the flap 12 until the flap 12 is adjacent to the body portion 14. The flap 13 is then folded inwardly about an imaginary axis indicated as 17 until the flap rests in part adjacent to the body portion 14 and the other portion of the flap 13 is superimposed upon the flap 12 with the adhesive material 15 in intimate sealing contact with the portion of the flap 12 thereunderneath. This interrelationship of the flaps 12 and 13 and body portion 14 defines a container or cavity, identified generally as 25 (Fig. 2), for receiving the seeds.

A transversely extending flap 18 is formed at one end of the body portion 14 and is covered with any desirable type of adhesive material 19 in a configuration similar to that shown in Fig. 3. The preferred requisites of the coating of adhesive material 19 are that the edge of the flap 18 adjacent to the body portion 14 and both edges of the flap 18 contiguous to this end be covered with adhesive material. The flap 18 is then folded inwardly about an imaginary axis indicated as 20 until the flap 18 rests upon the superimposed flaps 12 and 13. The adhesive material on flap 18 adheres to the material of the flaps 12 and 13 to form a pocket, the outline of which is indicated generally as 21.

A flap 22 is formed in the sheet 11 at the end of the body portion 14 directly opposite to the flap 18 and is adapted to be folded about an imaginary axis indicated as 23 to close the container or cavity 25. When flap 22 is folded inwardly toward the body portion 14 so as to close or seal off the cavity 25, the outer edge of flap 22 preferably extends almost into contact with the outer edge of the flap 18.

A seed marker stick 24 of any suitable material such as wood or plastic is formed with any desirable configuration. As shown in Fig. 1, the stick 24 is formed with a sharpened end to facilitate insertion of this stick into the ground when the stick 24 is used to mark the location of seeds in a seed bed following planting. The body of the stick 24 is printed with information relating to the type of the seed and the supplier thereof. The stick 24 is inserted into the pocket formed by the flap 18 and is of sufficient length that the outermost end of the stick extends out of the pocket to engage and hold in closed position the flap 22 which was previously folded into a position to close the cavity or enclosure 25. This projecting portion of the stick 24 carries the identifying indicia so that it is clearly visible to the observer without removing the stick 24 from the pocket.

As shown in Fig. 3, the flap 22 may be provided if desired with a layer of adhesive material 26 for permanently securing this flap in a closed position. However, the adhesive is not provided when it is necessary to repeatedly open the seed package for inspection of the contents thereof. As shown in Fig. 4, the outer surface of the body portion 14 is imprinted with various types of information such as advertising matter, planting instructions, and the name of the supplier of the seed.

In use, the flap 22 is opened and a quantity of seed placed in the cavity 25. The flap 22 is then folded about axis 23 to engage the upper surfaces of the flaps 12 and 13. The stick 24 is inserted into the pocket formed by the flap 18, so that the projecting portion of this stick engages and firmly secures the flap 22 against the flaps 12 and 13 to close the cavity 25. When the seeds are to be inspected, the stick is manually removed and the contents of the cavity 25 emptied out. The package may thereafter be again closed in the manner just described.

It is to be understood that the above described embodiments of the invention are merely illustrative of the principles thereof and that many other devices may be devised by those skilled in the art which will embody these principles and come within the spirit and scope thereof.

What is claimed is:

1. A seed package comprising an envelope open at one end containing seeds and having a short flap contiguous to said open end to close the envelope and a long flap contiguous to the other end secured to one side of said envelope to form a pocket, and rigid marker means inserted in said pocket and extending outwardly over said short flap engaging the short flap and holding it closed when the short flap is folded inwardly toward said pocket to close the envelope, said marker having indicia thereon identifying the seeds in the package and being so constructed and arranged as to be insertable in the ground after the seeds are planted.

2. A seed package comprising an envelope open at one end to receive seeds therein, a flap member integral with said envelope positioned adjacent said open end and adapted to be folded to close said open end to hold the seeds in place, means integral with the end of the envelope opposite to the open end secured to a side of the envelope to form a pocket terminating short of the lower extremity of the flap member and of a width less than the width of the envelope, and a rigid substantially flat marker constructed and arranged to be inserted in the ground after the seeds are planted, said marker identifying the seeds placed in the envelope and being of a width substantially the same as the pocket and removably held within the pocket overlying the flap and maintaining the flap in its envelope closing position while the seeds are in the envelope.

3. A seed package comprising an envelope having a pair of pockets opening in the same direction, one of said pockets being shorter than the other pocket and the other pocket having seeds therein, a flap foldable towards the one pocket over the mouth of said other pocket to close it and hold the seeds in place, said flap terminating short of the mouth of said one pocket, a substantially flat rigid ground marker stick removably received in said other pocket overlying the flap and holding it in its closed position, said stick having a pointed end arranged to be insertable in the ground to identify the seeds after they have been planted.

References Cited in the file of this patent

UNITED STATES PATENTS

| 505,001 | Ralph | Sept. 12, 1893 |
| 729,429 | Shattuc | May 26, 1903 |
| 768,670 | Martin | Aug. 30, 1904 |
| 1,586,016 | Walters | May 25, 1926 |
| 2,294,567 | Mooney | Sept. 1, 1942 |

FOREIGN PATENTS

| 620,095 | Great Britain | Mar. 18, 1949 |